US006078486A

United States Patent [19]

Le Cam

[11] Patent Number: 6,078,486

[45] Date of Patent: Jun. 20, 2000

[54] CONTROL OF ELECTRONIC STARTER MOTORS IN AUTOMOBILE VEHICLES

[75] Inventor: Frédéric Le Cam, Lyons, France

[73] Assignee: Valeo Equipements Electriques Moteur, Creteil, France

[21] Appl. No.: 09/042,258

[22] Filed: Mar. 13, 1998

[30] Foreign Application Priority Data

Mar. 14, 1997 [FR] France .................................. 97 03091

[51] Int. Cl.[7] ...................................................... H02H 5/04

[52] U.S. Cl. ............................................................. 361/23

[58] Field of Search ................................. 361/18, 23–34, 361/170, 171, 172, 187, 189, 190; 318/490; 307/10.1, 10.3, 10.6; 324/378, 380, 381, 384, 503

[56] References Cited

U.S. PATENT DOCUMENTS

| | | | |
|---|---|---|---|
| 3,870,954 | 3/1975 | Hanson et al. | 324/158 MG |
| 3,996,499 | 12/1976 | Gary et al. | 361/29 |
| 4,231,073 | 10/1980 | Suchko | 361/1 |
| 4,490,620 | 12/1984 | Hansen | 290/38 R |
| 4,862,010 | 8/1989 | Yamamoto | 290/38 R |
| 4,994,683 | 2/1991 | Yamamoto | 290/31 |
| 5,343,351 | 8/1994 | Quantz | 361/33 |
| 5,583,420 | 12/1996 | Rice et al. | 322/25 |
| 5,701,089 | 12/1997 | Perkins | 324/772 |

OTHER PUBLICATIONS

French Search Report dated Nov. 21, 1997.

*Primary Examiner*—Ronald W. Leja
*Attorney, Agent, or Firm*—Morgan & Finnegan, LLP

[57] ABSTRACT

Apparatus and method for controlling an automobile vehicle starter motor. The apparatus includes a control unit for controlling the supply of power to the starter motor, a means for providing protection functions, and a means to detect a signal to disable the protection functions. The apparatus includes a means for generating a signal to disable the protective functions, such as during testing of the starter motor. The protective functions include detecting malfunctions and cutting off the supply of power to the starter motor if a malfunction is detected.

27 Claims, 2 Drawing Sheets

CONTROL OF ELECTRONIC STARTER MOTORS IN AUTOMOBILE VEHICLES

The present invention relates to the control of electronic starter motors in automobile vehicles.

BACKGROUND OF THE INVENTION

FIG. 1 shows a starter motor D which includes an electric motor M connected between ground and a power supply terminal B+ at battery voltage.

A contactor 1 connected between said terminal B+ and the electric motor M controls the supply of power to the motor.

The contactor 1 is a relay with a moving core (not shown) actuated by an actuator coil 2 and a latching coil 3 respectively for pushing a power contact la into a closed position and for holding it there.

The actuator coil 2 is connected between the coil 3 and the side of the motor M that is not connected to ground. The opposite end of said coil 3 is connected to ground.

At their common end, the coils 2 and 3 are connected to the source of a transistor 4, for example a field effect transistor the drain of which is connected to the terminal B+ via the starter switch 6.

A microprocessor 5 also connected to the power supply terminal B+ applies a control voltage to the gate of the transistor 4 to control the transistor 4 on an on/off or progressive basis. As shown in FIG. 1, for example, the microprocessor 5 is integrated with the relay 1 and the transistor 4 in the starter motor casing. It can equally well be external of the starter motor, anywhere on the vehicle.

A starter motor of the above kind evidently has the advantage of being self-contained, that is to say of requiring no electrical connections other than those used by standard, non-electronic starter motors, namely a control cable for connecting it to the starter switch 6, a cable for supplying power to the motor M and a ground return via the starter motor casing.

The microprocessor 5 controls a number of functions. In particular, it stops the starter motor automatically when the vehicle engine starts. It also provides various protection functions; for example, it cuts off the supply of power to the starter motor if the motor M is overloaded or it runs too fast; it also cuts off the supply of power to the starter motor in the event of supply voltage surges.

The protection functions prevent some tests being carried out on the starter motor.

For example, to measure the speed characteristic of the starter motor for a given opposing torque, the starter motor must be supplied with power under stable conditions for several seconds, which leads to voltage or current variations. If the microprocessor is programmed to detect malfunctions by monitoring voltage or current variations, it stops the starter motor in a few tenths of a second. The measurement is then impossible.

A first solution which might be envisaged would be to provide an ancillary circuit for energizing the coil or coils of the contactor in parallel with the transistor 4 during measurements.

However, this solution would necessitate an additional terminal on the starter motor and additional wiring. This would result in a significant increase in cost and overall size.

OBJECTS AND SUMMARY OF THE INVENTION

The solution of the invention consists in a device for controlling an automobile vehicle starter motor contactor including a control unit for controlling the supply of power to the starter motor and including means for detecting malfunctions and cutting off the supply of power to the starter motor if a malfunction is detected, wherein the control unit further includes detector means having an input adapted to be connected to the starter switch of the vehicle, said detector means being adapted to detect, at said input, a signal for disabling protection functions.

The above device is used with a circuit adapted to be connected between the control unit and the vehicle switch and it includes means for generating a signal for disabling protection functions of the control unit.

BRIEF DESCRIPTION OF THE DRAWINGS

Other features and advantages of the invention will emerge from the following description. The description is purely illustrative and not limiting on the invention. It should be read with reference to the appended drawings, in which.

MORE DETAILED DESCRIPTION

Figure 1:
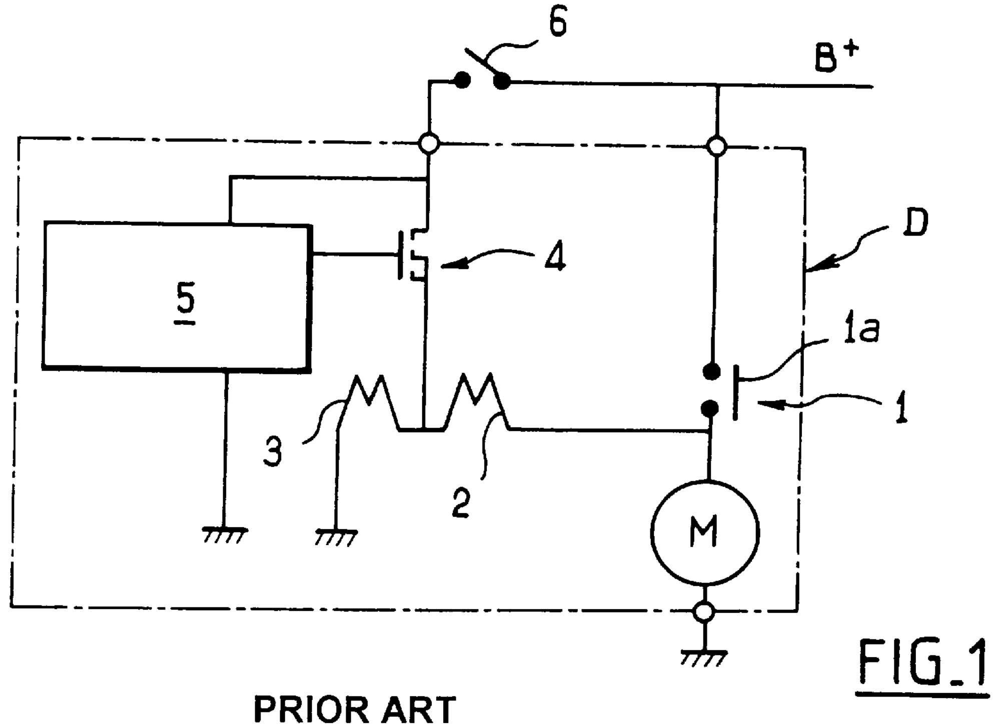
FIG 1 PRIOR ART
FIG. 1, described above, is a diagram showing a starter motor including an electronic control device 5.
Figure 2:
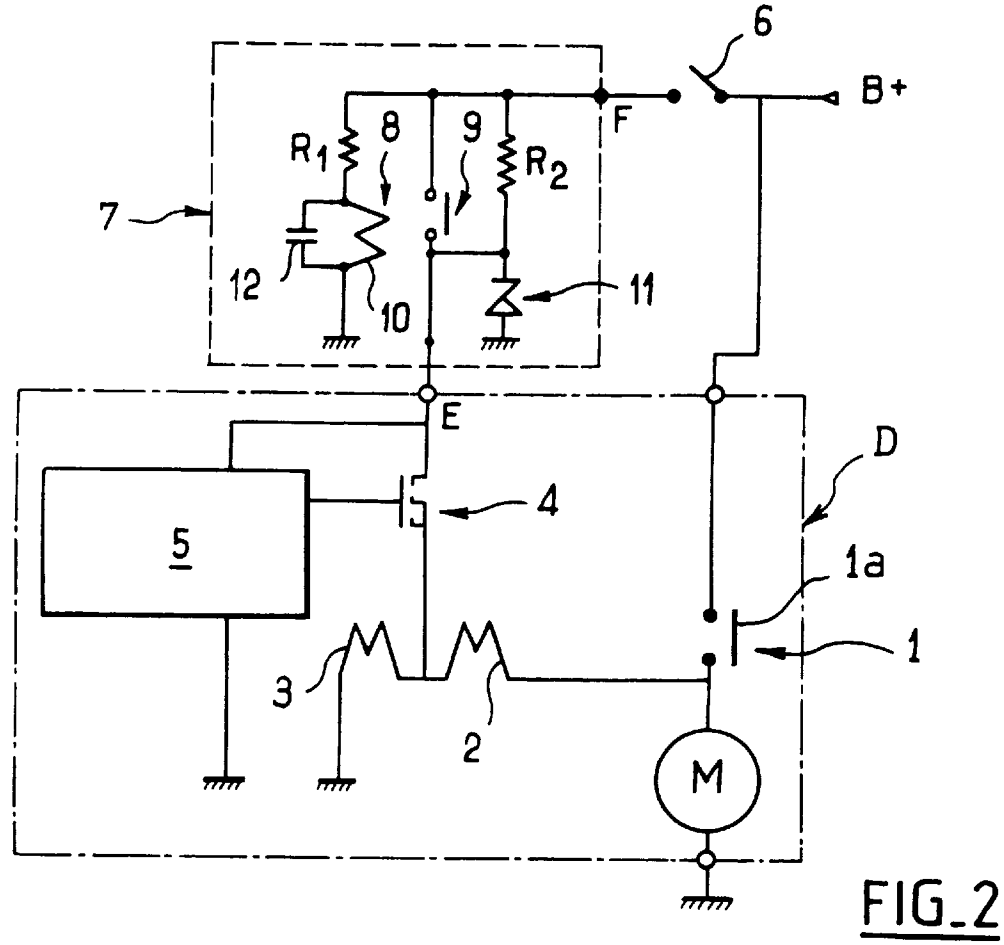
FIG. 2 is a diagram analogous to FIG. 1 showing a starter motor of the same type as in FIG. 1 and a circuit 7 for generating a signal for disabling the protection functions of the starter motor, which circuit 7 is connected between the starter motor control unit 5 and the starter switch 6 of the vehicle.

FIG. 2 shows a circuit 7 adapted to be connected between the starter switch 6 and an analogue-to-digital converter at the input of the microprocessor 5 when the starter motor is to be tested. The analogue-to-digital converter at the input to the microprocessor is not illustrated.

When the starter switch 6 is closed, the circuit 7 generates a signal that is recognized by the microprocessor 5 which is programmed to respond to detection of said signal by disabling the protection functions of the starter motor.

This disabling signal can be of any kind, for example a voltage or a current signal recognizable by its amplitude and/or its duration and/or its frequency and/or the number of pulses in it and/or by a particular binary code, etc.

In the circuit shown by way of example in FIG. 2 the signal generated is a calibrated voltage at a level $U_0$ which is applied to the input of the microprocessor 5 for a time period $T_0$ when the starter switch 6 closes.

The value of $U_0$ is higher than the minimum operating voltage of the microprocessor 5 and lower than the lowest voltage that can be present in the vehicle before starting the starter motor.

For example, $U_0$ is equal to 6±0.5 volts. The time period $T_0$ for which the voltage at the microprocessor input is held at the level $U_0$ is sufficiently long to prevent the microprocessor 5 confusing unintentional variations in said voltage with the disabling signal.

For example $T_0$ can be 20 milliseconds or more.

In the example shown in FIG. 2 the circuit 7 includes a relay 8, the switch 9 of which is connected between a terminal F adapted to be connected to the starter switch 6 and a terminal E adapted to be connected to an input of the microprocessor 5.

To be more precise, the terminal E is adapted to be connected to the terminal of the starter motor D that is normally connected to the switch 6, for example.

The coil 10 of the relay 8 is connected between ground and, via a resistor $R_1$, the terminal F.

The circuit 7 also includes a zener diode 11 which is connected between ground and the terminal E and which conducts in the direction from ground to said terminal E.

A resistor $R_2$ is connected in parallel with the switch 9 between the terminals E and F.

The circuit 7 also includes a capacitor 12 shunting the coil 8.

When testing starter motor D, circuit 7 is connected between starter switch 6 and terminal E of starter motor D. Terminal E is normally connected to switch 6.

In the testing configuration, when starter switch 6 closes, zener diode 11 imposes a voltage $U_0$ at the input of microprocessor 5 during the time period $T_0$, in which switch 9 is open. An effect of capacitor 12 is to increase the time to close switch 9 if the mechanical inertia of relay 8 is insufficient for switch 9 to close at the end of time period $T_0$.

The terminal E is connected to the B+ voltage when the switch 9 closes.

Figure 3:
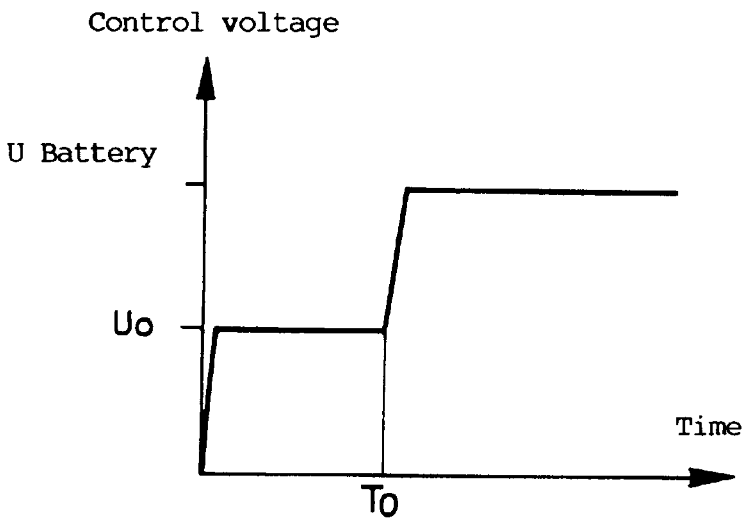
FIG. 3 is a graph showing one possible disabling signal.

The calibrated voltage received at the input of the microprocessor 5 when the starter switch 6 closes is therefore as shown in FIG. 3.

Figure 4:
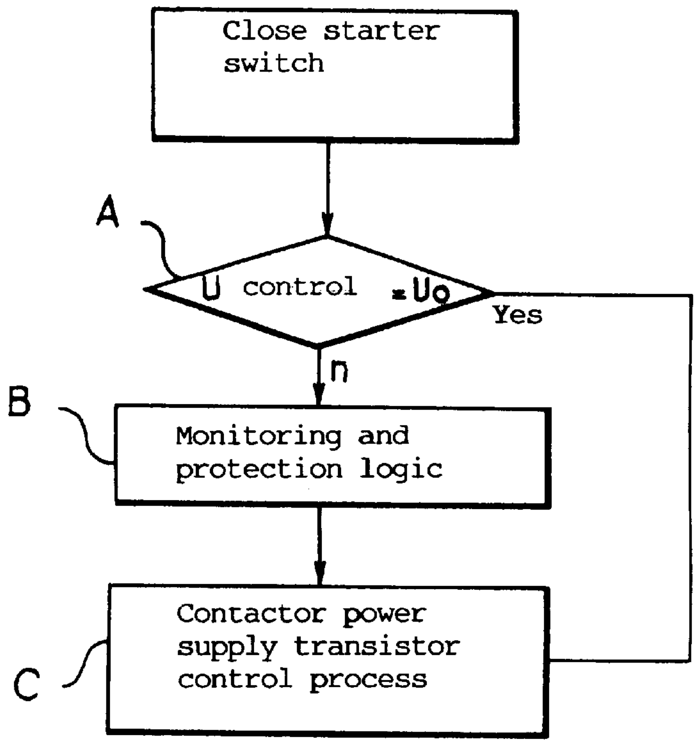
FIG. 4 is a flowchart giving various steps of the processing performed by the microprocessor of the FIG. 2 starter motor.

To detect a signal of this kind, each time that it detects closing of the starter switch 6 the microprocessor 5 carries out a comparison operation on the voltage that it receives at its input to verify whether or not this voltage assumes the value $U_0$ for the time period $T_0$ (step A in FIG. 4).

If not, the microprocessor 5 activates the control process for the transistor 4, and the protection functions (step B).

Otherwise, if the voltage received at its input by the microprocessor 5 is at the level $U_0$ for the time period $T_0$, the microprocessor 5 disables the protection functions and turns on the transistor 4 (step C).

The solution just described, which consists in using a circuit to generate signals for disabling the protection functions, has the advantage of enabling the starter motor to be supplied with power with its electronic protection functions disabled without requiring any additional connectors.

The interface circuit just described can be integrated into test equipment. The test equipment could be used to test electronic starter motors and conventional starter motors.

What is claimed is:

1. An apparatus for controlling a supply of power to a starter motor, comprising:

means for detecting a protection disable signal;

means for disabling a protection function of the starter motor, the protection function for supplying protected power to the starter motor; and means for supplying unprotected power to the starter motor in response to the protection disable signal, the unprotected power for testing.

2. An apparatus for disabling a protection function of a starter motor, comprising:

means for detecting a start signal on a first connection of the apparatus;

means for connecting the apparatus to the starter motor with a second connection; and means for generating a protection disable signal on the second connection, the protection disable signal different from the start signal and the protection disable signal for disabling the protection function of the starter motor for testing.

3. An apparatus according to claim 2, wherein said means for generating a protection disable signal generates a calibrated voltage for a predetermined time period when means for detecting a start signal detects a start signal.

4. An apparatus according to claim 3, wherein the calibrated voltage is higher than a minimum operating voltage of the apparatus and lower than a lowest voltage that can be present before the starter motor is started.

5. An apparatus according to claim 4, wherein the calibrated voltage is equal to approximately 6±0.5 volts.

6. An apparatus according to claim 3, wherein the predetermined time period is about 20 milliseconds or more.

7. An apparatus according to claim 3, further comprising a relay, a switch of which is connected between the first connection and the second connection.

8. An apparatus according to claim 7, wherein a coil of the relay is connected between ground and the first connection.

9. An apparatus according to claim 7, further comprising a zener diode which is connected between ground and the second connection and which zener diode is adapted to conduct in the direction from ground to the second connection.

10. An apparatus according to claim 7, further comprising a capacitor shunting a coil of the relay.

11. A control unit for a starter motor, comprising:

a protection circuit, for providing a protection function to the starter motor and for removing a supply of power to the starter motor in response to a malfunction of the starter motor; and a disable circuit, for disabling the protection circuit in response to a protection disable signal, the control unit providing unprotected power to the starter motor when the protection circuit is disabled, the unprotected power for testing.

12. A control unit for an automobile starter motor, comprising:

a protection circuit, for providing a protection function to the automobile starter motor in response to a malfunction of the starter motor;

a control voltage circuit, for controlling power to the automobile starter motor in response to the protection circuit, the control voltage circuit for removing the supply of power from the automobile starter motor; and a disable circuit, for disabling the protection circuit in response to a calibrated voltage, the control unit providing unprotected power to the automobile starter motor when the protection circuit is disabled, the unprotected power for testing.

13. An apparatus for controlling a supply of power to an automobile starter motor, comprising:

means for detecting a protection disable signal, the protection disable signal including a calibrated voltage for a predetermined time, the calibrated voltage different from a normal voltage of the automobile starter motor;

means for disabling a protection function of the automobile starter motor, the protection function for supplying protected power to the automobile starter motor; and supplying unprotected power to the automobile starter motor in response to the protection disable signal, the unprotected power for testing.

14. A method for controlling a supply of power to a starter motor, comprising:

detecting a protection disable signal; disabling a protection function of the starter motor, the protection function for supplying protected power to the starter motor; and supplying unprotected power to the starter motor in response to the protection disable signal, the unprotected power for testing.

15. A method for controlling a supply of power to an automobile starter motor, comprising:

detecting a protection disable signal, the protection disable signal including a calibrated voltage for a predetermined time, the calibrated voltage different from a normal voltage of the automobile starter motor disabling a protection function of the automobile starter motor, the protection function for supplying protected power to the automobile starter motor; and supplying unprotected power to the automobile starter motor in response to the protection disable signal, the unprotected power for testing.

16. An engine, comprising:

a starter motor, for starting the engine;

a protection circuit, for providing a protection function to the starter motor and for removing a supply of power to the starter motor in response to a malfunction of the starter motor; and a disable circuit, for disabling the protection circuit in response to a protection disable signal, the starter motor receiving unprotected power when the protection circuit is disabled, the unprotected power for testing.

17. An automobile engine, comprising:

a starter motor, for starting the automobile engine;

a control unit, for controlling a supply of power to the starter motor;

a protection circuit, for providing a protection function to the starter motor in response to a malfunction of the starter motor;

a control voltage circuit, for controlling power to the starter motor in response to the protection circuit, the control voltage circuit for removing the supply of power from the starter motor; and a disable circuit, for disabling the protection circuit in response to a calibrated voltage, the control unit providing unprotected power to the starter motor when the protection circuit is disabled, the unprotected power for testing.

18. An apparatus for disabling a protection function of a starter motor, comprising:

a first connection, for receiving a start signal;

a second connection, for connection to the starter; and a signal generation circuit, for generating a calibrated signal on the second connection in response to the start signal, the calibrated signal different from the start signal, the calibrated signal disabling the protection function of the starter motor for testing.

19. An apparatus for disabling a protection function of an automobile engine starter motor, comprising:

a first connection, for receiving a start signal;

a second connection, for connection to the automobile engine starter motor;

a timing circuit, for delaying transmission of the start signal to the automobile engine starter motor for a predetermined period of time; and a calibrated signal generation circuit, for generating a calibrated signal on the second connection during the predetermined period of time, the calibrated signal disabling the protection function of the automobile engine starter motor for testing.

20. An apparatus for disabling a protection function of an automobile engine starter motor, comprising:

a first connection, for receiving a start signal;

a second connection, for connection to a control unit of the automobile engine starter motor;

a timing circuit, for delaying transmission of the start signal to the control unit for a predetermined period of time of approximately 20 milliseconds or more; and a calibrated voltage generation circuit, for generating a calibrated voltage on the second connection during the predetermined period of time, the value of the calibrated voltage being approximately 6.0 plus or minus 0.5 volts, the calibrated voltage disabling the protection function of the automobile engine starter motor for testing.

21. A method for disabling a protection function of a starter motor, comprising:

connecting a test apparatus to the starter motor with a second connection;

detecting a start signal on a first connection of the test apparatus; and generating a protection disable signal on the second connection, the protection disable signal different from the start signal and the protection disable signal for disabling the protection function of the starter motor for testing.

22. A method for disabling a protection function of an automobile engine starter motor, comprising:

connecting a test apparatus to the automobile engine starter motor with a second connection;

detecting a start signal on a first connection of the test apparatus;

delaying transmission of the start signal to the automobile engine starter motor for a predetermined period of time; and generating a calibrated signal on the second connection for the predetermined period of time, the calibrated signal different from the start signal and the calibrated signal for disabling the protection function of the automobile engine starter motor for testing.

23. A method for disabling a protective function of an automobile engine starter motor, comprising:

connecting a test apparatus to a control unit of the automobile engine starter motor with a second connection;

detecting a start signal on a first connection of the test apparatus;

delaying transmission of the start signal to the control unit for a period of time of approximately 20 milliseconds or more; and generating a calibrated signal on the second connection during the period of time, the calibrated signal different from the start signal, the calibrated signal approximately 6.0 plus or minus 0.5 volts, and the calibrated signal for disabling the protection function of the automobile engine starter motor for testing.

24. A test apparatus for disabling a protection function of an automobile engine starter motor, comprising:

means for detecting a start signal on a first connection of the test apparatus;

means for connecting the test apparatus to the automobile engine starter motor with a second connection;

means for delaying transmission of the start signal to the automobile engine starter motor for a predetermined period of time; and means for generating a calibrated signal on the second connection for the predetermined period of time, the calibrated signal different from the start signal and the calibrated signal for disabling the protection function of the automobile engine starter motor for testing.

25. A test apparatus for disabling a protective function of an automobile engine starter motor, comprising:

means for detecting a start signal on a first connection of the test apparatus;

means for connecting the test apparatus to a control unit of the automobile engine starter motor;

means for delaying transmission of the start signal to the control unit for a period of time of approximately 20 milliseconds or more; and means for generating a calibrated signal on a second connection during the period of time, the calibrated signal approximately 6.0 plus or minus 0.5 volts, and the calibrated signal for disabling the protective function of the automobile engine starter motor for testing.

26. An engine, comprising:

a starter motor, for starting the engine;

a test apparatus, for disabling a protective function of the starter motor, the test apparatus including:

a first connection, for receiving a start signal;

a second connection, for connection to the starter motor; and a signal generation circuit, for generating a calibrated signal on the second connection in response to the start signal, the calibrated signal different from the start signal, the calibrated signal disabling the protection function of the starter motor for testing.

27. An automobile engine, comprising:

an automobile engine starter motor, for starting the automobile engine;

a control circuit, for controlling the automobile engine starter motor, the control circuit having a first connection, for receiving a start signal;

a second connection, for connection to the automobile engine starter motor;

a timing circuit, for delaying transmission of the start signal to the automobile engine starter motor for a predetermined period of time; and a calibrated signal generation circuit, for generating a calibrated voltage signal on the second connection during the predetermined period of time, the calibrated voltage signal disabling a protection function of the automobile engine starter motor for testing.

* * * * *